June 13, 1944. H. J. McCOMBS BURDICK 2,350,988
VALVE
Filed March 27, 1942 2 Sheets-Sheet 1
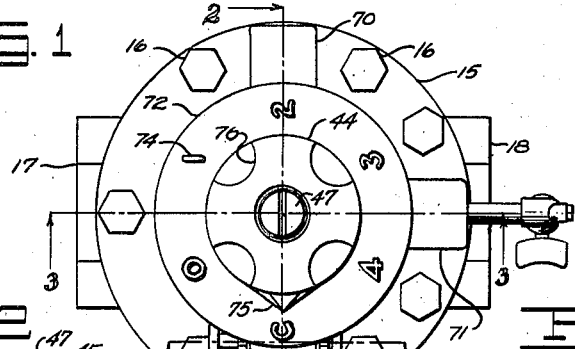
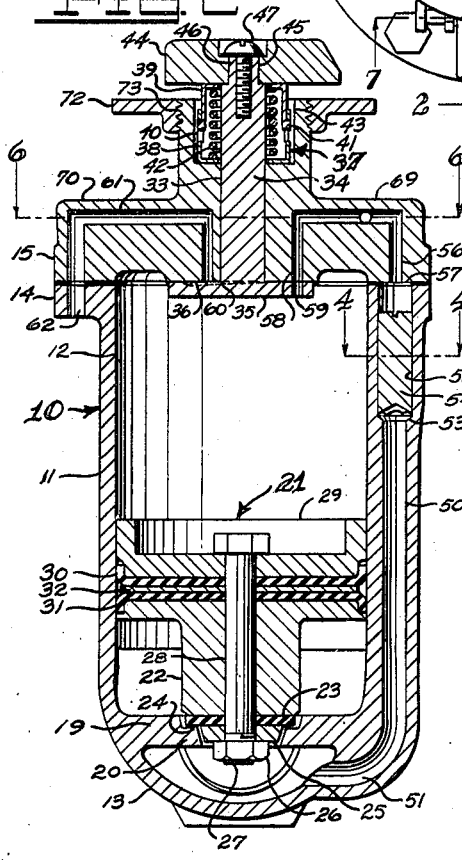
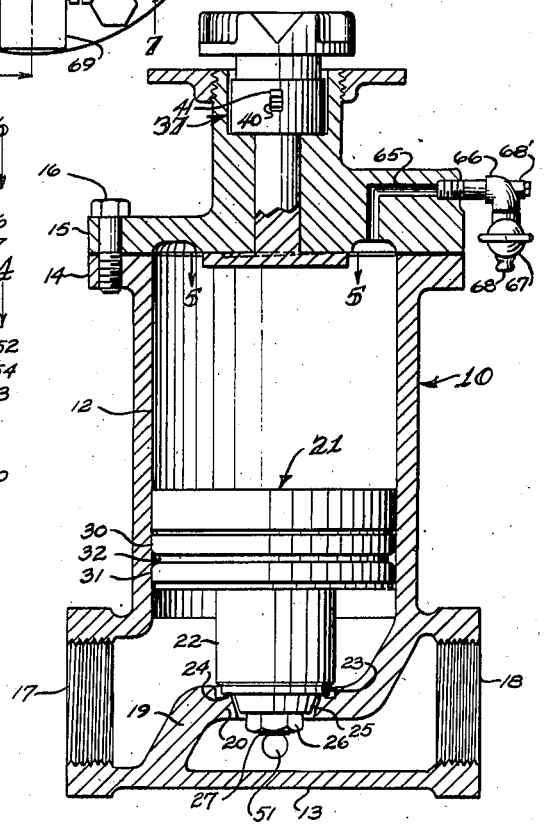
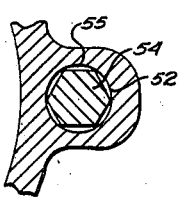
INVENTOR.
H.J. McCOMBS BURDICK
BY
ATTORNEY June 13, 1944.　　H. J. McCOMBS BURDICK　　2,350,988
VALVE
Filed March 27, 1942　　2 Sheets-Sheet 2
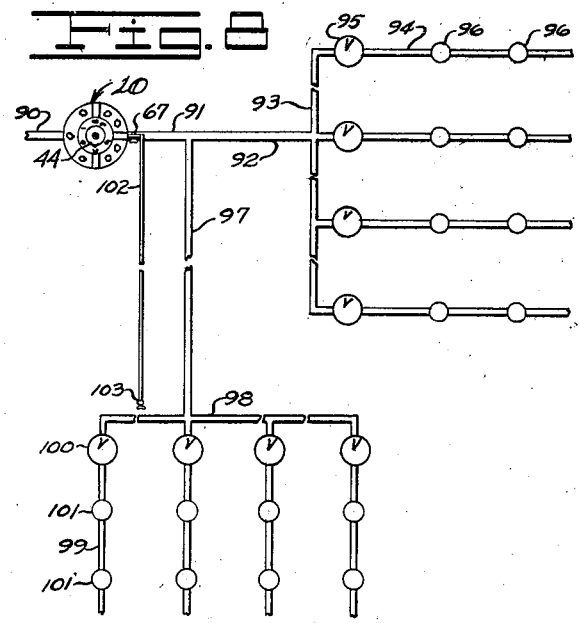
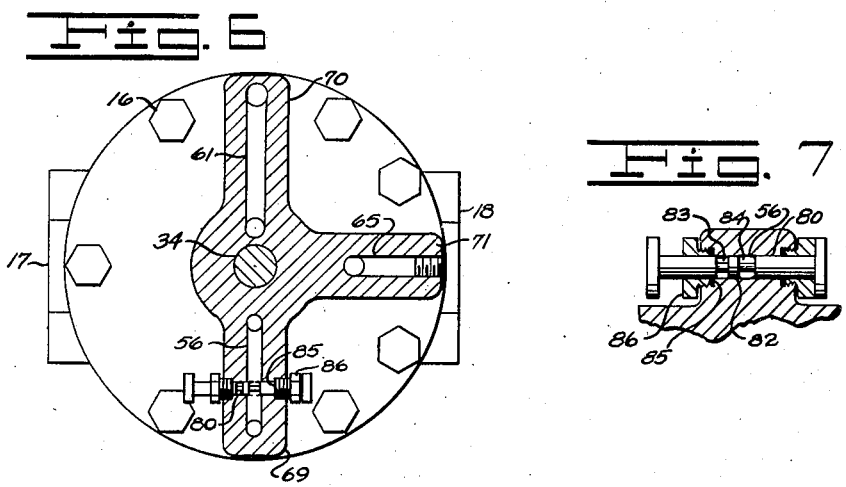
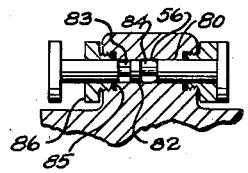
INVENTOR.
H.J. M<sup>c</sup>COMBS BURDICK
BY
ATTORNEY Patented June 13, 1944

2,350,988

UNITED STATES PATENT OFFICE 2,350,988

VALVE

Harry J. McCombs Burdick, Anaheim, Calif.

Application March 27, 1942, Serial No. 436,399

5 Claims. (Cl. 251—87)

This invention relates to a fluid control device.

The general object is to provide a novel, fluid pressure operated, time controlled, valve by means of which the passage of fluid through a conduit may be controlled.

A more specific object of my invention is to provide a novel valve for controlling passage of fluid through a conduit and wherein the passage of fluid through the conduit controls the valve.

Another object of the invention is to provide a time controlled valve including a novel regulating member.

A further object of the invention is to provide a novel time control valve having a novel check valve.

A further object of the invention is to provide a time control valve including a piston and cylinder and wherein novel means is provided for bleeding the cylinder.

An additional object of my invention is to provide a novel remotely controlled time valve.

Other objects and advantages of the invention will be apparent from the following description taken in connection with the accompanying drawings, wherein:

Fig. 1 is a top plan view of a valve embodying the features of my invention;

Fig. 2 is a section taken on line 2—2, Fig. 1;

Fig. 3 is a section taken on line 3—3, Fig. 1;

Fig. 4 is a section taken on line 4—4, Fig. 2;

Fig. 5 is a section taken on line 5—5, Fig. 3;

Fig. 6 is a section taken on line 6—6, Fig. 2;

Fig. 7 is a section taken on line 7—7, Fig. 1, and on an enlarged scale; and

Fig. 8 is a diagrammatic plan view showing my improved water distribution system.

Referring to the drawings by reference characters, I have shown my invention as embodied in a time valve which is indicated generally at 10.

As shown, the device 10 includes a hollow cylindrical body 11, having an internal bore 12 and having a closed bottom 13. Opposite the closed bottom 13, the body includes a flange 14 which is engaged by a cap enclosure member 15 with the parts held together by bolts 16.

The body 11 is provided with a fluid outlet 17 and a fluid inlet 18 both of which are adapted to be connected to suitable pipes.

The lower portion of the body includes a valve seat forming partition 19 which includes a valve seat 20. Within the bore 12 I arrange a sliding valve indicated generally at 21. As shown this valve includes a body 22 having a gasket 23 engaging the lower end thereof. The gasket 23 engages a bead 24 surrounding the valve seat. The gasket 23 is held in place by a disk 25. The disk 25 is held in place by a nut 26 on a bolt 27 which passes through an aperture 28 in the valve body 22. The bolt 27 serves to hold a piston cap member 29 in place.

Between the cap member and body 22 I arrange upper and lower packings 30 and 31 which are separated by a plate member 32.

The various packing members may be made of rubber, artificial rubber or similar material and the various members of the valve and body may be made of suitable material, for example brass and certain of the parts may be suitably plated, as for example with hard chromium to reduce wear and corrosion.

The cap member 15 includes an aperture 33 in which the stem 34 of a regulating member is rotatably and slidably arranged. At its lower end the stem 34 includes a flange 35 which engages the adjacent face 36 of the cap member 15. The engaging faces are planar and the parts are held together by a resilient device indicated generally at 37. As shown, the resilient device includes an outer retainer member 38 and an inner retainer member 39 which slides within the retainer 38. The member 38 is provided with opposed slots 40 in which tongues 41 on the member 39 are arranged. A coiled spring 42 is arranged within the members 38 and 39 and the assembled device is mounted in a recess 43 in the cap member and about the stem. The member 38 engages the bottom of the recess and the member 39 engages the lower face of a head 44. The head 44 has an aperture 45 which fits over a reduced portion 46 on the stem 33 and is held in place by a screw 47.

The construction is such that the regulating member may be rotated thus rotating the stem 33 or the regulating member may be depressed by pushing down on the head 44.

The body 11 is provided with a conduit 50 which at one end as at 51 opens into the body 11 below the partition. The upper portion of the conduit 50 includes an enlarged portion 52 which has a shoulder 53 at the lower end thereof. The portion 52 is cylindrical and in this portion I arrange a check valve 54 (Fig. 4) which is shown as hexagonal to provide a passage for fluid through the channels 55 when the check valve is in the position shown in Fig. 1. The cap member includes a conduit 56 smaller than and aligned with the conduit portion 55 thus providing the shoulder 57 against which the upper end of the check valve 54 engages when the valve is in its upper position.

The conduit 56 includes a downwardly extending portion 58 which when the flange 35 is in one position aligns with a hole 59 in the flange. The upper surface of the flange 35 includes a metering slot 60 which is graduated from the hole 59 and is arranged coaxial with the axis of the stem 34. The groove 60 is deepest adjacent the hole 59 and is of decreasing depth as it recedes from this hole. The construction is such that when the hole 59 aligns with the conduit portion 58 free passage is allowed to the interior of the cylinder.

When the flange 35 is turned, fluid passes from the conduit portion 58 to the groove 60 and thence through the groove 60 to the hole 59 and thus passage is restricted from the conduit 58. When the extreme end of the groove 60 aligns with the conduit portion 58 a minimum amount of liquid passes from the conduit portion 58 into the cylinder. When the end of the groove 60 passes beyond the conduit portion 58 no fluid flows from the conduit portion 58 into the cylinder.

The cap member 15 includes a bleed conduit 61 which aligns with a similar conduit 62 on the body. The conduit 61 also aligns with a bleed aperture 63 in the flange 35 when the flange 35 is turned to one position. The bleed aperture 63 is arranged nearer to the axis of the stem 34 than the metering groove 60, as shown in Fig. 5, so that this aperture 63 at no time communicates with the conduit portion 58.

The cap member 15 further includes a bleed aperture 65, one end of which communicates with the interior of the cylinder and the other end of which is connected to an elbow 66. The elbow receives a valve 67 which has an outlet 68 to the atmosphere. The elbow 66 includes a coupling portion 69' which may be closed or may be connected to a conduit as will be later described.

The conduits 56, 61 and 65 are arranged in bosses 69, 70 and 71 respectively on the cap member 15. The cap member includes a collar 72 held in place by threads 73. The collar includes indicia members 74 and the head 44 includes a pointer 75 alignable with the indicia members 74 when the stem 34 is rotated. The head 44 includes notches 76 which may be engaged by the fingers or by a suitable wrench member thus permitting the stem 34 to be turned.

In the boss 69 I show a bore 80 which intercepts the conduit 56 and which receives a sliding metering valve 82. The valve 82 includes grooves 83 and 84 of different widths. The valve 82 may be shifted to present either of the grooves therein to metering position so that flow through the conduit 56 may be controlled. Surrounding the metering valve 82 I provide packings 85 held in place by packing nuts 86.

In the use of my improved valve I connect the inlet 18 to a suitable source of water supply and connect the outlet 17 to an outlet pipe. In operation the head 44 may be turned so that the aperture 63 in the flange 35 aligns with the bleed conduit 61 so that the upper portion of the cylinder 11 will be free to communicate with the atmosphere. Instead of bleeding the cylinder in this fashion the valve 67 may be opened to bleed the cylinder or if desired the head 44 may be pushed downwardly thus moving the flange 35 away from the lower face of the cap member. In the last two bleeding operations—that is, by means of the valve 67 or by depressing the head 44—the angular setting of the head 44 will not be disturbed. When the head 44 is turned to align the aperture 63 with the conduit 61, the head 44 must be turned to the desired position after the cylinder is bled.

Assuming the cylinder is bled by turning the flange 35 to align the aperture 63 therein with the bleed aperture 61, the fluid enters the inlet aperture 18 and urges the piston valve 21 upwardy, thereby discharging fluid in the upper portion of the cylinder through the bleed aperture 61. During the operation, the check valve 54 may be forced against its seat by the fluid which passes through the conduit 50.

The lifting of the valve 21 opens the valve seat or the orifice 20 and allows free passage of fluid through the outlet aperture 17. As soon as the fluid ceases to flow from the bleed aperture 62, the operator closes the bleed valve by turning the head 44 to the desired position with reference to the indicia 74 so that the desired portion of the groove 60 is opposite the conduit 58. This allows the pressure within the device 10 above and below the piston to become substantially equalized and as a result the valve 21 gradually moves downwardly to its seat. As the final closing of the valve takes place, the pressure above the piston increases and the full pressure in the supply conduit presses against the top of the piston 21 thus forcing the valve 21 firmly against its seat 20.

When the differential in pressure above the piston increases, the velocity of flow in the conduit 50 also increases and under this increased velocity finally forces the check valve 54 upwardly against the lower face of the cap member 15. The check valve has a small notch 52' in its upper end and when the check valve is against its seat, there is a slight leakage through this notch 52' and this allows the fluid pressure to urge the piston slowly downwardly. Near the end of the downward stroke the main flow is slowly decreased by the action of the tapered sleeve 25 and the final movement is retarded by the check valve 54 thereby eliminating the difficulties of a water hammer effect.

In Fig. 8 I show my improved water distribution system wherein the valve device 10 has the inlet connected to a supply pipe 90 and the outlet is connected to a distributing main 91. The distributing main is connected to a pipe 92 which in turn is connected to a header 93. The header 93 is connected to a plurality of laterals 94. Each lateral includes a control valve 95 which may be of the hand operated type and each lateral 94 includes a plurality of sprinkler heads 96.

The outlet 91 is also connected to a pipe 97 which is connected to a header 98. The header 98 is connected to a plurality of laterals 99 each of which includes a control valve 100 and sprinkler heads 101. In the construction shown, the coupling 69 on the bleed fitting 66 is connected to a pipe 102 which extends to a location adjacent the header 98 and is there provided with a bleed valve 103 similar to the bleed valve 67 and the construction is such that the upper portion of the cylinder of the device 10 may be bled by opening either the valve 67 or the valve 103.

The head 98 and the valve 103 are preferably remote from the device 10 while the header 93 may be close to the valve 10.

In operation the attendant opens one of the lateral line valves—say the top valve 95—and then opens the bleed valve 67. The bleed valve 67 is allowed to remain open until liquid ceases to flow from the bleed aperture, whereupon the valve 67 is closed. Water will now be supplied to the sprinkler heads 96 of the upper lateral and the attendant is free to look after other duties until the period of flow determined by the position of the head 44 has passed. After such period, the valve device 10 will cut off the flow.

The attendant may at his convenience return and close off the valve 95 which was open and open another of the valves 95. He may then operate the bleed valve 67 and return to his duties. This operation may be continued until all of the area covered by the sprinkler 96 has been sprinkled, whereupon the last of the valves 95 is closed. In performing this operation, the operator may bleed the device 10 by depressing the stem 34 or by rotating this stem instead of using the bleed valve 67.

When the sprinklers 101 are to be operated, one of the associated valves 100 is opened and the remote bleed valve 103 is opened for a period and then closed. After a period of time the device 10 will close the valve therein and the operation may be repeated. The other valves 100 may be similarly operated.

Thus it will be seen that my system permits an attendant to look after other duties while the sprinkling is being done and also permits operation of the system remotely from the valve device 10.

When the valve is operating for long periods of time, the small portion of the metering slot 60 is employed and is very sensitive to adjustment. With my construction, by bleeding through the conduit 65, the adjustment of the metering slot 60 need not be altered each time the valve is actuated so that the correct adjustment remains.

The arrangement shown whereby the valve closes against the flow and pressure and with the conduit 50 leading to the inlet permits my valve to be used to replace the usual sprinkler angle valve.

In some sprinkling systems small spray heads are employed and these operate but a few minutes at a time. In other systems large rotary heads are employed which are operated at a considerable length of time. With my construction the attendant may readily change from the long period to the short period and vice versa by shifting the metering valve 82 from one position to the other and the metering valve is also of considerable use in certain commercial installations.

From the foregoing description it will be apparent that I have invented a novel fluid control device and water distribution system which can be economically manufactured and readily installed and which is highly efficient for its intended purpose.

Having thus described my invention, I claim:

1. In a fluid control device, a housing, a closure for said housing, said closure having a plane lower face and having a bore therethrough, a regulating member having a stem rotatable in said bore, a flange on the inner end of said stem, said housing including a conduit, said flange and closure having coacting means operable to control flow through said conduit, said closure having a recess therein about said stem, a pair of telescoping sleeves in said recess, said sleeves having end flanges, a spring about said sleeves and engaging said end flanges, and means to prevent relative rotation between said sleeve members.

2. In a fluid control device, a housing, a cap member on said housing, said cap member having a plane lower face and having a bore therethrough, a regulating member having a stem rotatable and slidable in said bore, a flange on the inner end of said stem, said flange having a hole therethrough, the upper face of said flange having a circular groove therein, one end of said groove communicating with said flange aperture, said groove being of increasing cross sectional area towards one end thereof, said housing having a conduit therein, said conduit having an opening at one end aligned with said flange aperture when the stem is turned to one position, the other end of said conduit being adapted to communicate with a source of fluid under pressure, said cap member having a bleed aperture communicating at one end with the atmosphere, said flange having an aperture aligned with the other end of the bleed aperture in one position of said stem, said regulating member stem having an indicating member thereon, said indicating member being normally disposed above the cap member, and spring means engaging said cap member and said indicating member and normally urging said stem outwardly to thereby urge said flange into engagement with said cap member.

3. In a fluid control device, a housing, a closure on said housing, said closure having a plane lower face and having a bore therethrough, a regulating member having a stem rotatable in said bore, a flange on the inner end of said stem, said flange having a hole therethrough, the upper face of said flange having a groove therein, one end of said groove communicating with said flange aperture, said groove being of increasing cross sectional area towards one end thereof, said housing having a conduit therein, said conduit having an opening at one end aligned with said flange hole when the stem is turned to one position, the other end of said conduit being adapted to communicate with a source of fluid under pressure, said closure member having a bleed aperture communicating at one end with the atmosphere, said flange having an aperture aligned with the other end of the bleed aperture in one position of said stem, said regulating member stem having an indicating member thereon and means to hold said flange in engagement with said cap member.

4. In a fluid control device, a housing, a closure on said housing, said closure having a bore therethrough, a regulating member having a stem rotatable in said bore, a flange on the inner end of said stem, said flange having a hole therethrough, the upper face of said flange engaging the lower face of said closure, the upper face of said flange having a groove therein, one end of said groove communicating with said flange aperture, said groove being of increasing cross sectional area towards one end thereof, said housing having a conduit therein, said conduit having an opening at one end aligned with said flange hole when the stem is turned to one position, the other end of said conduit being adapted to communicate with a source of fluid under pressure, said closure member having a bleed aperture communicating at one end with the atmosphere, said flange having an aperture aligned with the other end of the bleed aperture in one position of said stem, and means to hold said flange in engagement with said cap member.

5. In a fluid control device, a housing having a closure portion at one end, said closure portion having a bore therethrough, a regulating member having a stem rotatable and slidable in said bore, a flange on said stem, said flange engaging the inner face of said closure portion, said flange having a hole therethrough, the upper face of said flange having a groove therein, one end of said groove communicating with said flange aperture, said groove being of increasing cross sectional area towards one end thereof, said housing having a conduit therein, said conduit having an opening at one end aligned with said flange aperture when the stem is turned to one position, the other end of said conduit being adapted to communicate with a source of fluid under pressure, said closure portion having a bleed aperture communicating at one end with the atmosphere, said flange having an aperture aligned with the other end of the bleed aperture in one position of said stem, said stem having a head on the outer end thereof and spring means engaging said closure portion and said stem head and normally urging said stem outwardly to thereby urge said flange into engagement with said closure portion.

HARRY J. McCOMBS BURDICK.